United States Patent
Schmid

(10) Patent No.: US 7,405,543 B2
(45) Date of Patent: Jul. 29, 2008

(54) DEVICE FOR REGULATING THE POWER OUTPUT OF AN ELECTRICAL GENERATOR IN MOTOR VEHICLES

(75) Inventor: Manfred Schmid, Pipinsried (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/942,206

(22) Filed: Nov. 19, 2007

(65) Prior Publication Data

US 2008/0074086 A1    Mar. 27, 2008

Related U.S. Application Data

(63) Continuation of application No. PCT/EP2006/004864, filed on May 23, 2006.

(30) Foreign Application Priority Data

Jun. 2, 2005    (DE) ................... 10 2005 025 251

(51) Int. Cl.
    *H02P 9/10*    (2006.01)
(52) U.S. Cl. .......................... 322/33; 322/37
(58) Field of Classification Search ............... 322/22, 322/28, 33, 34, 37; 123/481
    See application file for complete search history.

(56) References Cited

U.S. PATENT DOCUMENTS

| | | | |
|---|---|---|---|
| 4,556,943 A * | 12/1985 | Pauwels et al. ............ 701/115 |
| 4,600,993 A * | 7/1986 | Pauwels et al. ............ 701/103 |
| 5,629,606 A * | 5/1997 | Asada ......................... 322/28 |
| 5,645,745 A * | 7/1997 | Hartwick et al. ............ 219/497 |
| 5,826,563 A * | 10/1998 | Patel et al. .................. 123/481 |
| 7,199,559 B2 * | 4/2007 | Yanagi ....................... 322/33 |
| 2002/0051368 A1 | 5/2002 | Ulinski et al. |
| 2003/0169520 A1 | 9/2003 | Goldstein |

FOREIGN PATENT DOCUMENTS

| | | |
|---|---|---|
| DE | G 93 13 750.8 U1 | 2/1994 |
| DE | 197 29 883 A1 | 1/1998 |
| DE | 100 18 706 A1 | 10/2001 |
| DE | 101 06 944 A1 | 9/2002 |
| EP | 1 225 074 A2 | 7/2002 |
| WO | WO 00/05806 A1 | 2/2000 |

OTHER PUBLICATIONS

International Search Report dated Jul. 26, 2006 with English Translation (Four (4) pages).
German Search Report dated May 5, 2006 with English Translation of the relevant portion (Ten (10) pages).

* cited by examiner

*Primary Examiner*—Nicholas Ponomarenko
(74) *Attorney, Agent, or Firm*—Crowell & Moring LLP

(57) ABSTRACT

In a device for regulating the power output of an electrical generator in motor vehicles having an internal combustion engine, in which the generator has a regulator unit, which prevents exceeding at least one limiting temperature by regulation, the regulator unit is connected via a bidirectional interface to an electronic control unit assigned to the internal combustion engine. The control unit and the regulator unit are designed in such a way that the regulator unit, after transmitting at least one value relevant to the limiting temperature from the control unit to the regulator unit, stores the particular applicable limiting temperature determined by this value.

20 Claims, 1 Drawing Sheet

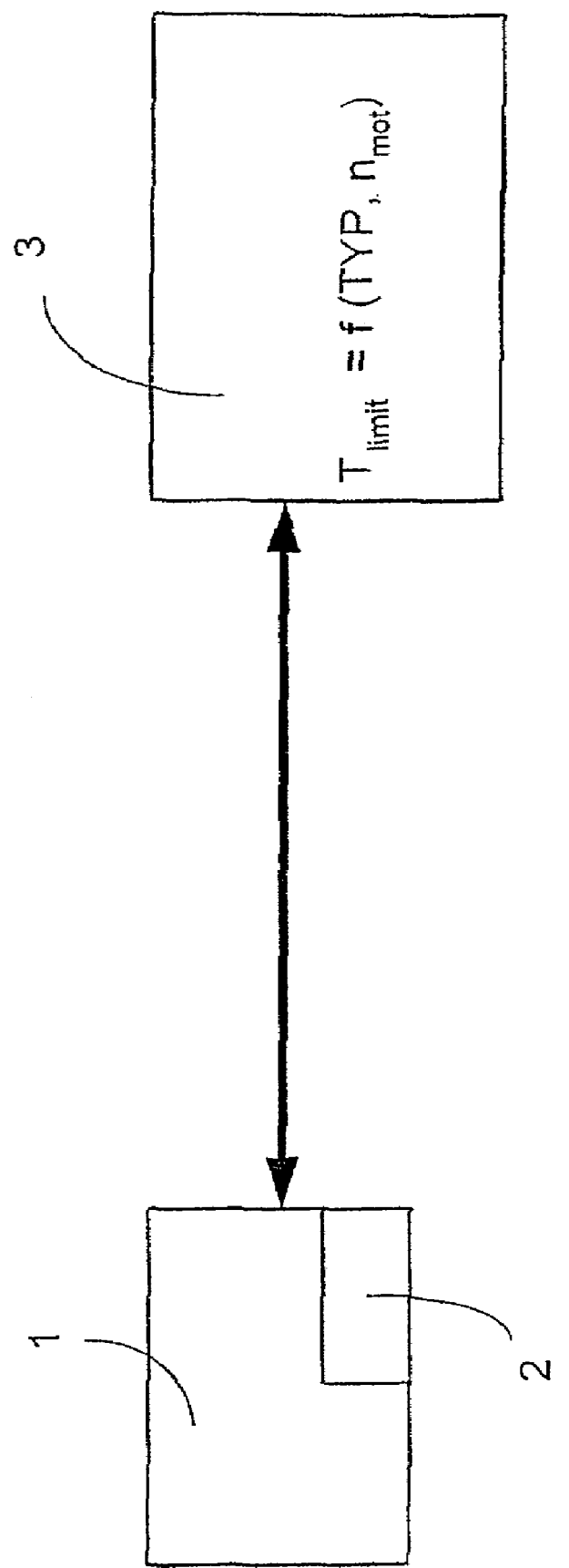

DEVICE FOR REGULATING THE POWER OUTPUT OF AN ELECTRICAL GENERATOR IN MOTOR VEHICLES

CROSS REFERENCE TO RELATED APPLICATIONS

This application is a continuation of PCT International Application No. PCT/EP2006/004864, filed May 23, 2006, which claims priority under 35 U.S.C. § 119 to German Patent Application No. 10 2005 025 251.6, filed Jun. 2, 2005, the entire disclosures of which are herein expressly incorporated by reference.

BACKGROUND AND SUMMARY OF THE INVENTION

The present invention relates to a device for regulating the power output of an electrical generator in motor vehicles.

A device of this type is known, for example, from German patent document DE 101 06 944 A1. In the known generator regulator units having temperature limiting for thermal protection, the limiting temperatures are permanently and unchangeably programmed in the regulator units. Therefore, a special limiting temperature tailored to the individual application must be provided in the regulator units for every application in the vehicle. A high variant manifold thus arises when constructing generators having integrated regulator units.

It is an object of the present invention to improve a device of the type cited above in regard to standardization and thus cost optimization.

This and other objects and advantages are achieved according to the present invention by a device for regulating the power output of an electrical generator in motor vehicles having an internal combustion engine, in which the generator has a regulator unit, which prevents exceeding at least one limiting temperature by regulation. The regulator unit is connected via a bidirectional interface to an electronic control unit assigned to the internal combustion engine. The control unit and the regulator unit are designed in such a way that the regulator unit, after transmitting at least one value relevant to the limiting temperature from the control unit to the regulator unit, stores the particular applicable limiting temperature determined by this value.

A value relevant to the limiting temperature may, for example, be the particular applicable limiting temperature itself, an offset value which is added by the regulator unit to a base value to reach the particular applicable limiting temperature, or a parameter by which the regulator unit selects the particular applicable limiting temperature from a parameter-related list of limiting temperatures. The parameter may be an application-specific data relating to the cooling conditions of the generator and/or an operation-specific data relating to the heat generation in the generator environment, or may be calculated therefrom.

The control unit may determine the value relevant to the limiting temperature as a function of at least one application-specific data relating to the cooling conditions of the generator, such as the engine installation space, as a fixed value.

Alternatively or additionally, the control unit may determine the value relevant to the limiting temperature variably as a function of at least one operationally-specific data relating to the heat generation in the generator surroundings, such as the instantaneous engine speed or the instantaneous engine output.

The present invention is based on the following findings:

The regulator unit may be programmed with the same base value as the limiting temperature for every application in the vehicle. According to the present invention, this base value may be overwritten using a particular new applicable limiting temperature or have a new offset value applied to it, resulting in a new applicable limiting temperature, when the unit is first put into operation in the vehicle, at least for the application-specific adaptation. The base value may also be used as an emergency operation limiting temperature in case of interface error. According to the present invention, different limiting temperatures may be determined for various components. The temperature limiting may occur according to the prior art.

Through the present invention, it is possible to provide standards which may be designed as correspondingly flexible by the interface communication. Through these standards, it is possible to achieve significantly simpler component handling in the replacement part market. Unnecessary trimming of the generator output power or no limiting at temperatures which are too high is often to be observed due to the limiting at a single fixed limiting temperature according to the prior art.

Other objects, advantages and novel features of the present invention will become apparent from the following detailed description of the invention when considered in conjunction with the accompanying drawings.

BRIEF DESCRIPTION OF THE DRAWING

The FIGURE illustrates an exemplary embodiment of a device according to the present invention.

DETAILED DESCRIPTION OF THE DRAWING

The FIGURE shows a generator 1, which has an intelligent regulator unit 2. The regulator unit 2 is connected via a bidirectional interface to an electronic control unit 3 external to the generator, which is predominantly used to control the internal combustion engine. The exemplary embodiment shows the especially advantageous design of the present invention in which the control unit 3 transmits, as the value relevant to the limiting temperature, the particular applicable limiting temperature $T_{limit}$ itself, as a function of the engine installation space TYP and of the instantaneous engine speed $n_{mot}$ here, to the regulator unit 2, for example.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for regulating output power of an electrical generator in a motor vehicle having an internal combustion engine, in which the generator has a regulator unit, which prevents exceeding at least one limiting temperature by regulation, wherein the regulator unit is connected via a bidirectional interface to an electronic control unit assigned to the internal combustion engine, and the control unit and the regulator unit are designed in such a way that the regulator unit, after transmitting at least one value related to the limiting temperature from the control unit to the regulator unit, stores a particular applicable limiting temperature determined by the at least one value.

2. The device according to claim 1, wherein the value relevant to the limiting temperature is the particular applicable limiting temperature.

3. The device according to claim 1, wherein the value relevant to the limiting temperature is an offset value, which is added by the regulator unit to a base value to reach the particular applicable limiting temperature.

4. The device according to claim 1, wherein the value relevant to the limiting temperature is a parameter, by which the regulator unit selects the particular applicable limiting temperature from a parameter-related list of limiting temperatures.

5. The device according to claim 1, wherein the control unit determines the value relevant to the limiting temperature as a fixed value as a function of at least one application-specific data relating to the cooling conditions of the generator.

6. The device according to claim 1, wherein the control unit determines the value relevant to the limiting temperature variably as a function of at least one operationally-specific data relating to heat generation in the generator surroundings.

7. The device according to claim 4, wherein the parameter is at least one of an application-specific data relating to the cooling conditions of the generator and an operationally-specific data relating to the heat generation in the generator surroundings, or is calculated therefrom.

8. The device according to claim 2, wherein the control unit determines the value relevant to the limiting temperature as a fixed value as a function of at least one application-specific data relating to the cooling conditions of the generator.

9. The device according to claim 3, wherein the control unit determines the value relevant to the limiting temperature as a fixed value as a function of at least one application-specific data relating to the cooling conditions of the generator.

10. The device according to claim 4, wherein the control unit determines the value relevant to the limiting temperature as a fixed value as a function of at least one application-specific data relating to the cooling conditions of the generator.

11. The device according to claim 2, wherein the control unit determines the value relevant to the limiting temperature variably as a function of at least one operationally-specific data relating to heat generation in the generator surroundings.

12. The device according to claim 3, wherein the control unit determines the value relevant to the limiting temperature variably as a function of at least one operationally-specific data relating to heat generation in the generator surroundings.

13. The device according to claim 4, wherein the control unit determines the value relevant to the limiting temperature variably as a function of at least one operationally-specific data relating to heat generation in the generator surroundings.

14. The device according to claim 5, wherein the control unit determines the value relevant to the limiting temperature variably as a function of at least one operationally-specific data relating to heat generation in the generator surroundings.

15. A device for regulating output power of an electrical generator in a motor vehicle having an internal combustion engine, comprising:
 a regulator unit configured to prevent exceeding at least one limiting temperature by regulation; and
 a bidirectional interface connecting the regulator unit to an electronic control unit assigned to the internal combustion engine,
 wherein, after transmission of at least one value related to the limiting temperature from the control unit to the regulator unit, the regulator unit stores a particular applicable limiting temperature determined by the at least one value.

16. The device according to claim 15, wherein the value relevant to the limiting temperature is the particular applicable limiting temperature.

17. The device according to claim 15, wherein the value relevant to the limiting temperature is an offset value, which is added by the regulator unit to a base value to reach the particular applicable limiting temperature.

18. The device according to claim 15, wherein the value relevant to the limiting temperature is a parameter, by which the regulator unit selects the particular applicable limiting temperature from a parameter-related list of limiting temperatures.

19. The device according to claim 15, wherein the control unit determines the value relevant to the limiting temperature as a fixed value as a function of at least one application-specific data relating to the cooling conditions of the generator.

20. A method for regulating output power of an electrical generator in a motor vehicle having an internal combustion engine, comprising the acts of:
 transmitting at least one value related to at least one limiting temperature from a control unit to a regulator unit;
 determining a first limiting temperature, based upon the at least one value;
 storing the first limiting temperature in the regulator unit; and
 preventing the first limiting temperature from being exceeded by regulating the output power of the generator.

* * * * *